US012341293B2

(12) United States Patent
Kataoka et al.

(10) Patent No.: US 12,341,293 B2
(45) Date of Patent: Jun. 24, 2025

(54) LEVER-TYPE CONNECTOR

(71) Applicant: SUMITOMO WIRING SYSTEMS, LTD., Mie (JP)

(72) Inventors: Daisuke Kataoka, Mie (JP); Kazuo Nakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 305 days.

(21) Appl. No.: 17/912,737

(22) PCT Filed: Mar. 2, 2021

(86) PCT No.: PCT/JP2021/007799

§ 371 (c)(1),
(2) Date: Sep. 19, 2022

(87) PCT Pub. No.: WO2021/192834

PCT Pub. Date: Sep. 30, 2021

(65) Prior Publication Data

US 2023/0216242 A1 Jul. 6, 2023

(30) Foreign Application Priority Data

Mar. 23, 2020 (JP) ................................ 2020-050573

(51) Int. Cl.
*H01R 13/629* (2006.01)

(52) U.S. Cl.
CPC ..... *H01R 13/62905* (2013.01); *H01R 13/629* (2013.01); *H01R 13/62944* (2013.01)

(58) Field of Classification Search
CPC ............ H01R 13/629; H01R 13/62905; H01R 13/56
USPC ........................................................ 439/347
See application file for complete search history.

(56) References Cited

U.S. PATENT DOCUMENTS

| | | | | |
|---|---|---|---|---|
| 4,941,837 | A * | 7/1990 | Nakamura | H01R 13/631 439/341 |
| 2014/0134862 | A1 | 5/2014 | Itou et al. | |
| 2014/0242819 | A1 | 8/2014 | Suzuki | |
| 2014/0242820 | A1 | 8/2014 | Suzuki | |

(Continued)

FOREIGN PATENT DOCUMENTS

| | | | | |
|---|---|---|---|---|
| EP | 933836 | A2 * | 8/1999 | H01R 13/62905 |
| JP | 2015-220077 | A | 12/2015 | |
| JP | 2015-220078 | A | 12/2015 | |

OTHER PUBLICATIONS

International Search Report issued on May 18, 2021 for WO 2021/192834 A1 (4 pages).

*Primary Examiner* — Christopher M Koehler
*Assistant Examiner* — Gregory L Mangot
(74) *Attorney, Agent, or Firm* — Venjuris, P.C.

(57) ABSTRACT

The lever-type connector includes: a housing; a slider having a plurality of rack teeth arranged in a first direction, the slider being movable in the first direction relative to the housing; a wire cover installed on the housing and covering a wire draw-out surface of the housing; and a lever configured to move the slider, the lever being rotatably installed on the wire cover and having a gear meshing with the rack teeth, wherein the housing has a fulcrum portion rotatably supporting the wire cover, and a positioning portion coming into contact with the wire cover and causing the gear to be located at a position at which the gear meshes with the rack teeth.

7 Claims, 6 Drawing Sheets

(56) References Cited

U.S. PATENT DOCUMENTS

| | | | | |
|---|---|---|---|---|
| 2014/0242821 | A1 | 8/2014 | Suzuki | |
| 2014/0242822 | A1 | 8/2014 | Suzuki | |
| 2014/0273566 | A1* | 9/2014 | Allgood | H01R 13/516<br>439/157 |
| 2017/0279215 | A1* | 9/2017 | Shibaya | H01R 13/62977 |

* cited by examiner

LEVER-TYPE CONNECTOR

CROSS REFERENCE TO RELATED APPLICATIONS

This application is a national phase of PCT application No. PCT/JP2021/007799, filed on 2 Mar. 2021, which claims priority from Japanese patent application No. 2020-050573, filed on 23 Mar. 2020, all of which are incorporated herein by reference.

TECHNICAL FIELD

The present disclosure relates to a lever-type connector.

BACKGROUND

Lever-type connectors are conventionally known with which fitting to a counterpart connector is enabled by operating a lever. For example, lever-type connectors described in Patent Documents 1 to 3 each have a lever on a wire cover that covers a wire draw-out surface of a housing. The housings of these lever-type connectors each have sliders that slide in response to an operation of the lever. Each slider has a cam groove capable of receiving a cam follower provided in a counterpart connector. The slider is held at a predetermined position relative to the housing when fitting to the counterpart connector is initiated. The predetermined position refers to a position at which the cam follower of the counterpart connector is fitted to the cam groove. The slider is slid from the predetermined position by fitting the cam follower to the cam groove and operating the lever. The lever-type connector is normally fitted to the counterpart connector through engagement between the cam groove in the slider and the cam follower of the counterpart connector.

These lever-type connectors described in Patent Documents 1 and 2 have rack teeth on the sliders and gears on the lever. The sliders of these lever-type connectors move due to meshing between the gears and rack teeth.

PRIOR ART DOCUMENT

Patent Document

Patent Document 1: JP 2014-099267 A
Patent Document 2: JP 2015-220077 A
Patent Document 3: JP 2014-165031 A

SUMMARY OF THE INVENTION

Problems to be Solved

When the wire cover is attached to the housing, there are cases where the gears of the wire cover come into contact with the rack teeth of the sliders and shift the sliders from the predetermined positions. If the sliders are shifted from the predetermined positions, the cam followers of the counterpart connector cannot be fitted to the cam grooves. For this reason, there is a desire to prevent the gears of the wire cover from coming into contact with the rack teeth of the slider and shifting the slider positions when the wire cover is attached to the housing.

The present disclosure aims to provide a lever-type connector capable of preventing a gear of a wire cover from coming into contact with rack teeth of a slider and shifting the slider position when the wire cover is attached to a housing.

Means to Solve the Problem

A lever-type connector of the present disclosure includes: a housing; a slider having a plurality of rack teeth arranged in a first direction, the slider being movable in the first direction relative to the housing; a wire cover installed on the housing and covering a wire draw-out surface of the housing; and a lever configured to move the slider, the lever being rotatably installed on the wire cover and having a gear meshing with the rack teeth, wherein the housing has a fulcrum portion rotatably supporting the wire cover, and a positioning portion coming into contact with the wire cover and causing the gear to be located at a position at which the gear meshes with the rack teeth.

Effect of the Invention

According to the present disclosure, a lever-type connector can be provided that is capable of preventing a gear of a wire cover from coming into contact with rack teeth of the slider and shifting the slider position when the wire cover is attached to a housing.

DETAILED DESCRIPTION TO EXECUTE THE INVENTION

Description of Embodiments of Present Disclosure

Figure 1:
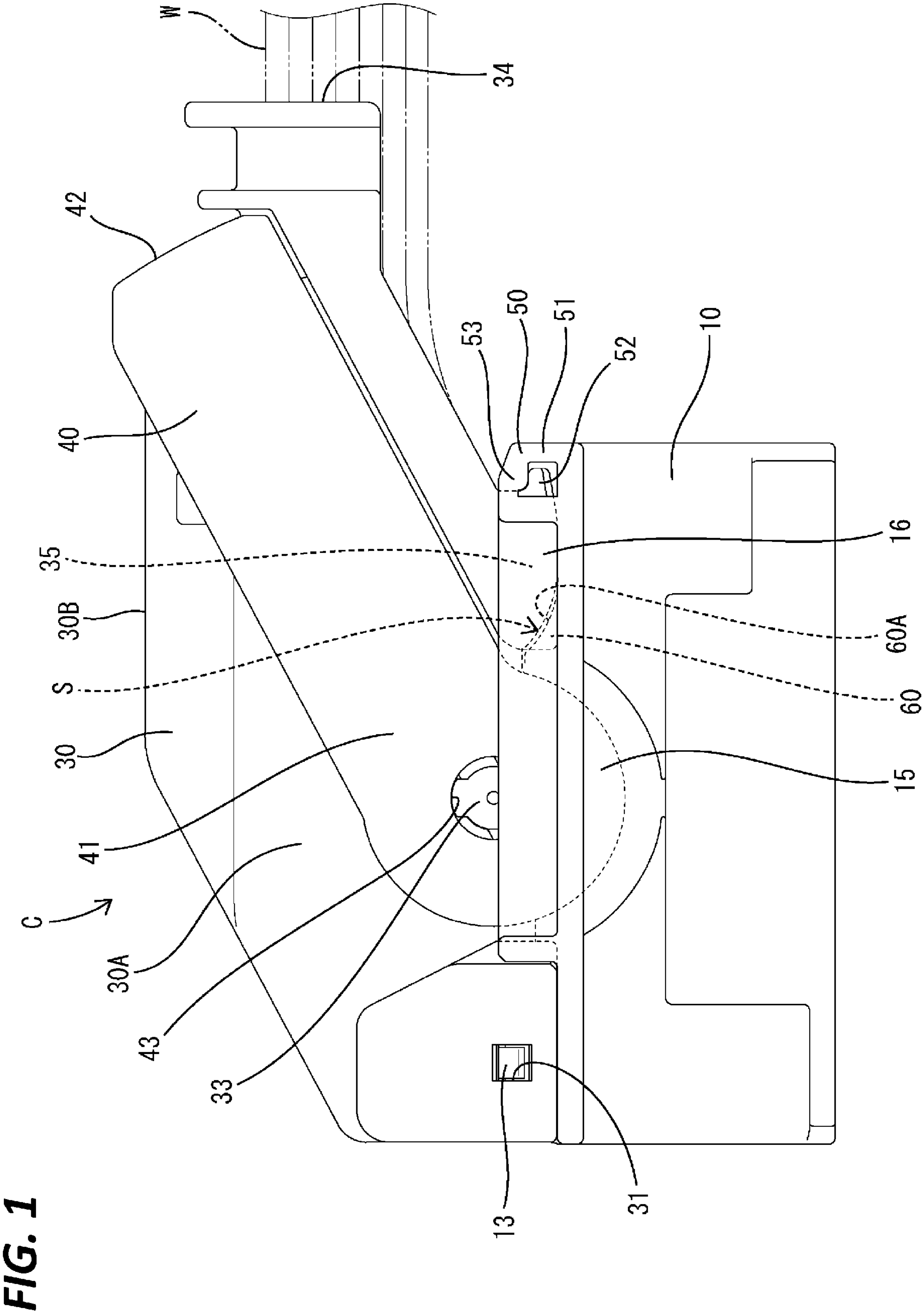
FIG. 1 is a side view of a lever-type connector according to the present embodiment.

Firstly, modes for carrying out the present disclosure will be listed and described.

(1) A lever-type connector of the present disclosure includes: a housing; a slider having a plurality of rack teeth arranged in a first direction, the slider being movable in the first direction relative to the housing; a wire cover installed on the housing and covering a wire draw-out surface of the housing; and a lever configured to move the slider, the lever being rotatably installed on the wire cover and having a gear meshing with the rack teeth, wherein the housing has a fulcrum portion rotatably supporting the wire cover, and a positioning portion coming into contact with the wire cover and causing the gear to be located at a position at which the gear meshes with the rack teeth. This configuration enables the wire cover to be positioned so that the gear meshes with the rack teeth when the wire cover is rotated while being supported by the fulcrum portion. Accordingly, the gear of the wire cover can be prevented from coming into contact with the rack teeth of the slider and shifting the slider position when the wire cover is attached to the housing.

(2) It is preferable that the fulcrum portion has a protruding portion protruding from the housing in a direction intersecting the first direction, the wire cover has a fitting portion fitted to the protruding portion from a direction parallel to the first direction, and the positioning portion is located at an opposite position to the protruding portion relative to the fitting portion and has a face curved in a direction in which the wire cover rotates. This is because this configuration enables the wire cover to be easily positioned.

(3) The housing may have a gear arrangement portion in its center area in the first direction, the gear being arranged in the gear arrangement portion when the wire cover is in a state of being attached to the housing, and both the protruding portion and the positioning portion may be located on one side in the first direction relative to the gear arrangement portion. This is because this configuration enables the housing to be made more compactly than in the case where the protruding portion is provided on one side in the first direction of the housing and the positioning portion is provided on the other side.

(4) It is favorable that the fulcrum portion has a rotation axis portion serving as a rotation center of the wire cover, and a corner portion of a surface of the rotation axis portion that comes into contact with the wire cover has a curved face. This is because this configuration enables the wire cover to rotate more smoothly than in the case where the corner portion of the surface of the rotation axis portion that comes into contact with the wire cover is right-angled.

Details of Embodiments of Present Disclosure

Specific examples of a lever-type connector of the present disclosure will be described below with reference to the drawings. Note that the present invention is not limited to these examples but is described by the claims, and is intended to include all modifications made within the meaning and scope equivalent to the claims.

As shown in FIG. 1, the lever-type connector C has a housing 10, a wire cover 30, a lever 40, fulcrum portions 50, and positioning portions 60. Hereinafter, regarding the constituent members, the upper side refers to the side on which the wire cover 30 is attached (upper side in FIG. 1), the lower side refers to the opposite side to the side on which the wire cover 30 is attached (lower side in FIG. 1), the rear side refers to the side on which the fulcrum portions 50 are provided (right side in FIG. 1), and the front side refers to the opposite side to the side on which the fulcrum portions 50 are provided (left side in FIG. 1). Further, in the following description, the left side refers to the proximal side in the direction perpendicular to the paper of FIG. 1, and the right side refers to the distal side.

Figure 2:
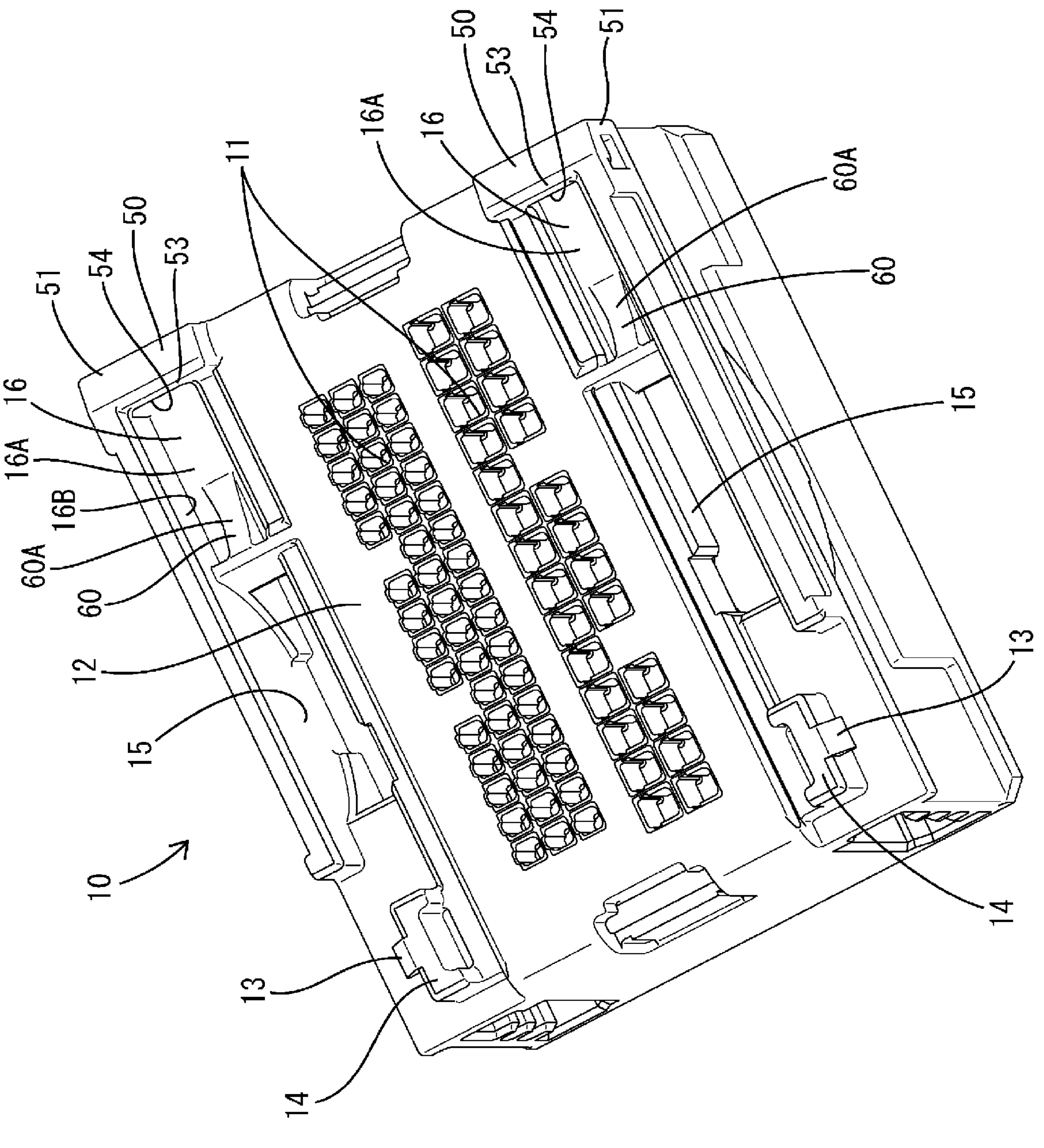
FIG. 2 is a perspective view of a housing.

The housing 10 is made of synthetic resin. The housing 10 has a shape elongated in the front-back direction. As shown in FIG. 2, the housing 10 has a plurality of terminal accommodating holes 11 for accommodating terminal fittings. The plurality of terminal accommodating holes 11 are arranged in the front-back direction and the left-right direction.

Terminal fittings are put into the terminal accommodating holes 11 from above. Terminal fittings are connected to terminal portions of wires W. The wires W are pulled out upward from a wire draw-out surface 12 of the housing 10. The bundle of wires W is bent backward within the wire cover 30.

Figure 3:
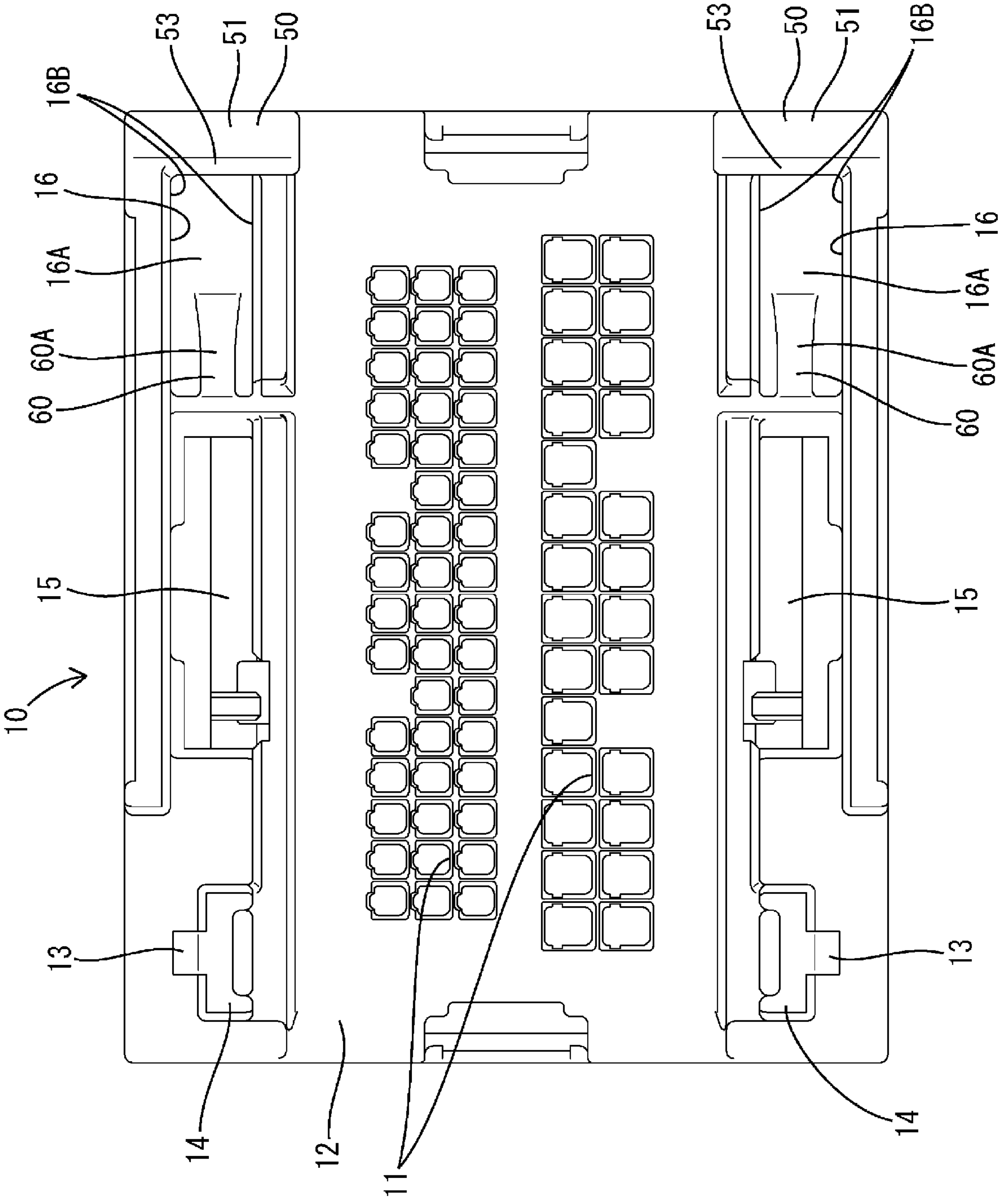
FIG. 3 is a plan view of the housing.

As shown in FIGS. 2 and 3, the housing 10 has lock portions 13 for locking the wire cover 30 in an attached state. The lock portions 13 are provided at front end portions of the housing 10. Two lock portions 13 are provided, one on the left side and the other on the right side of the housing 10.

The lock portions 13 are provided in lock walls 14, which protrude upward from the wire draw-out surface 12 of the housing 10. The lock portions 13 protrude outward from the respective lock walls 14 (the right lock portion 13 protrudes rightward from the right lock wall 14, and the left lock portion 13 protrudes leftward from the left lock wall 14). The lock portions 13 are fitted to lock receiving portions 31 provided in the wire cover 30.

Figure 6:
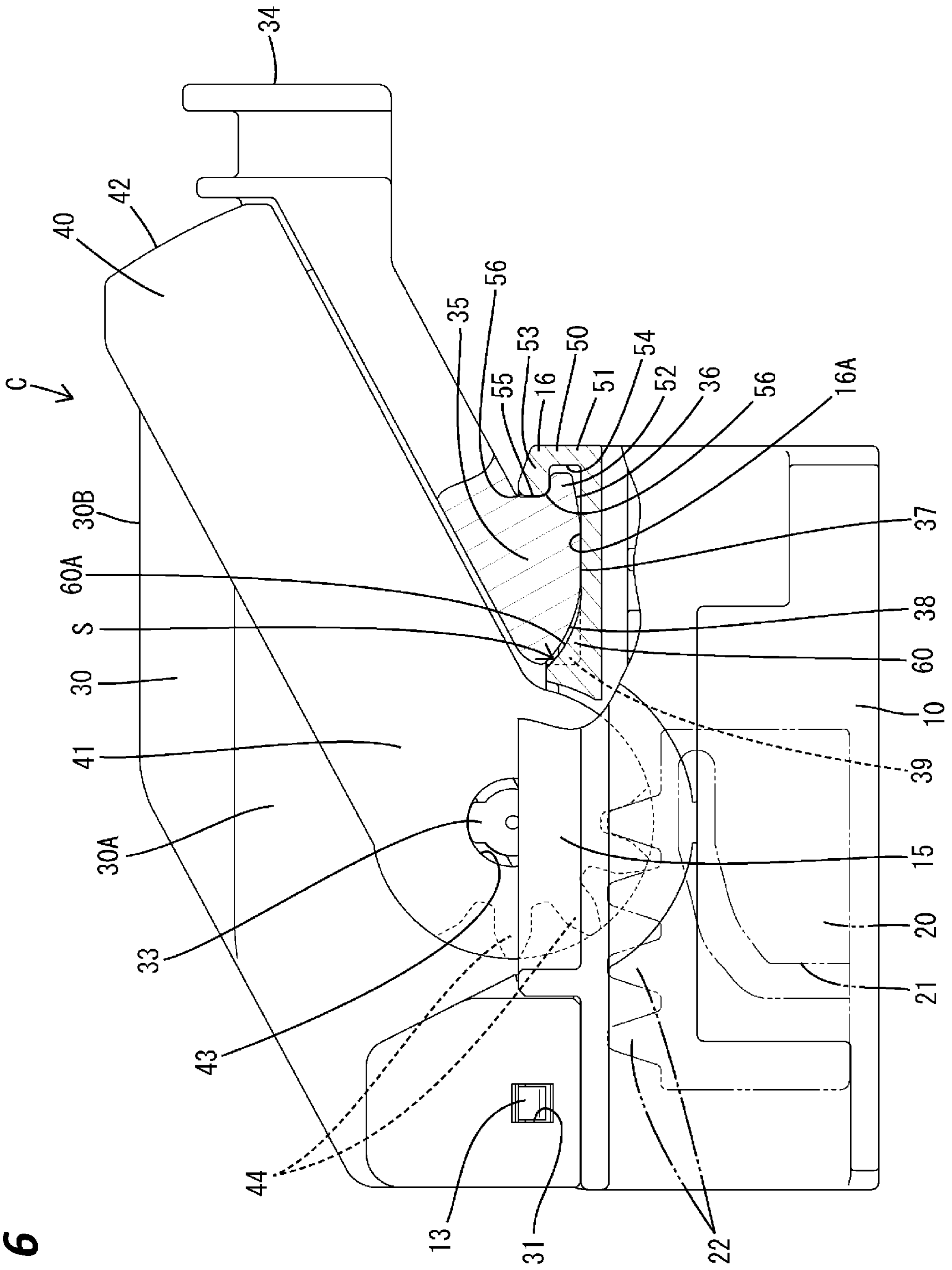
FIG. 6 is a partially cut-out side view that shows the wire cover attached to the housing.

The housing 10 has gear arrangement portions 15 (see FIG. 6). Gears 44 of the lever 40 are arranged in the gear arrangement portions 15 when the wire cover 30 is in a state of being attached to the housing 10. The gear arrangement portions 15 are provided in a center area of the housing 10 in the front-back direction (first direction). As shown in FIGS. 2 and 3, two gear arrangement portions 15 are arranged, one on the left side and the other on the right side of the housing 10. The gear arrangement portions 15 are recessed portions that are open on the upper face side and recessed downward. The gears 44 of the lever 40 are fitted to the gear arrangement portions 15 from above.

As shown in FIGS. 2 and 3, the housing 10 has support receiving portions 16. The support receiving portions 16 support support portions 35 provided in the wire cover 30 when the wire cover 30 is attached to the housing 10. The support receiving portions 16 are provided on the rear side relative to the gear arrangement portions 15. Two support receiving portions 16 are provided, one on the left side and the other on the right side of the housing 10. The support receiving portions 16 are recessed portions that are open on the upper side.

Bottom faces 16A of the support receiving portions 16 are parallel to the wire draw-out surface 12. Side faces 16B of the support receiving portions 16 are perpendicular to the wire draw-out surface 12. The support receiving portions 16 each have a fulcrum portion 50 and a positioning portion 60. The fulcrum portion 50 and the positioning portion 60 will be described later in detail.

Figure 5:
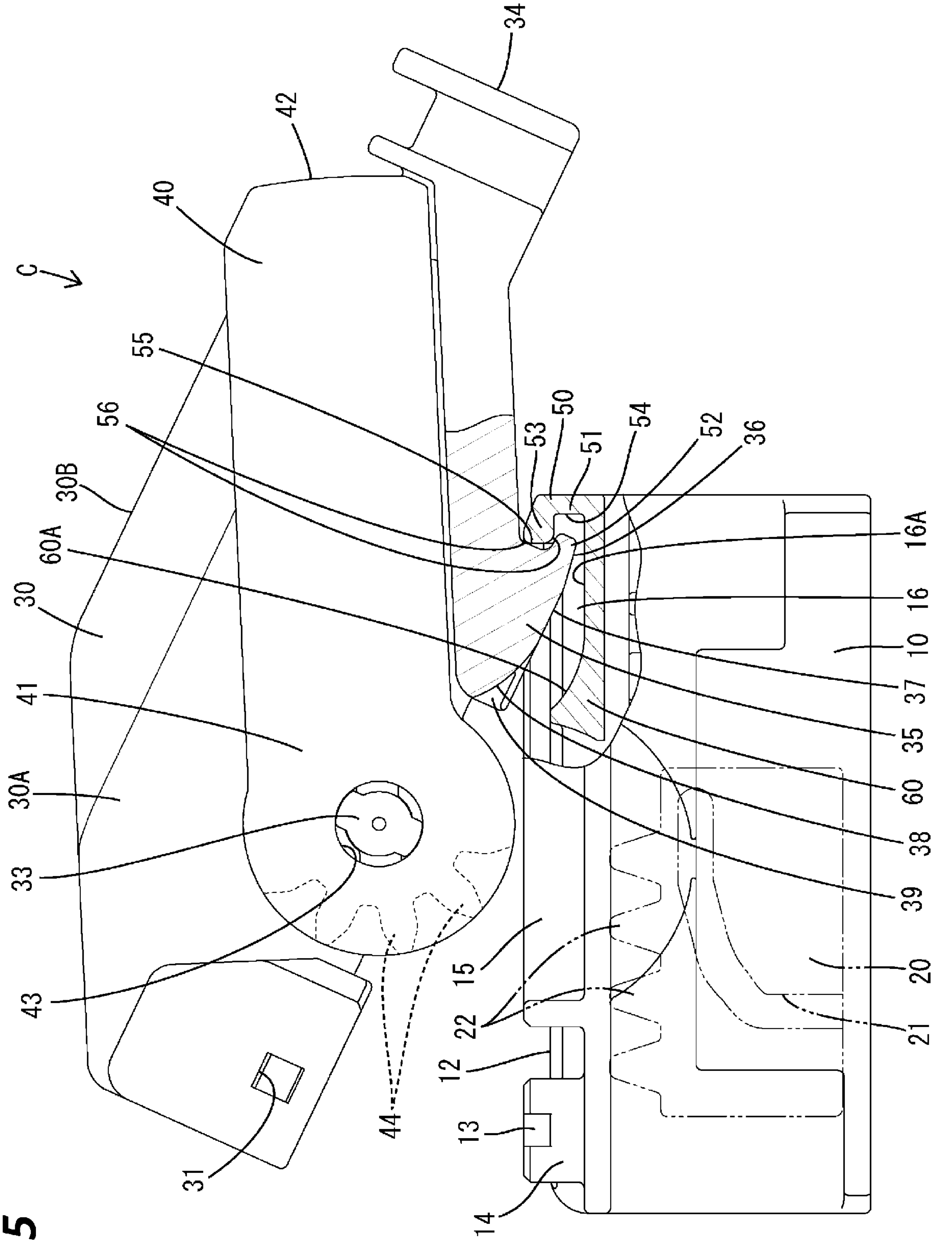
FIG. 5 is a partially cut-out side view that shows how the wire cover is attached to the housing.

The housing 10 has sliders 20 (see FIG. 5). The sliders 20 are made of synthetic resin. Each slider 20 has a flat plate shape. Two sliders 20 are provided, one on the left side and the other on the right side of the housing 10. Each slider 20 has a cam groove 21, to which a cam follower of a counterpart connector is fitted. The sliders 20 are movable in the front-back direction (first direction). Each slider 20 moves between a slider initial position, at which the slider 20 is held when fitting to the counterpart connector is initiated, and a slider fitting completion position, at which the slider 20 is held when the fitting to the counterpart connector is complete. In FIG. 5, one of the sliders 20 arranged at the slider initial position is indicated by double-dashed lines. The slider fitting completion position is a position on the rear side (right side in FIG. 5) relative to the slider initial position. Each slider 20 has a plurality of rack teeth 22 that are arranged in the front-back direction. The rack teeth 22 are arranged on the upper faces of the sliders 20.

Figure 4:
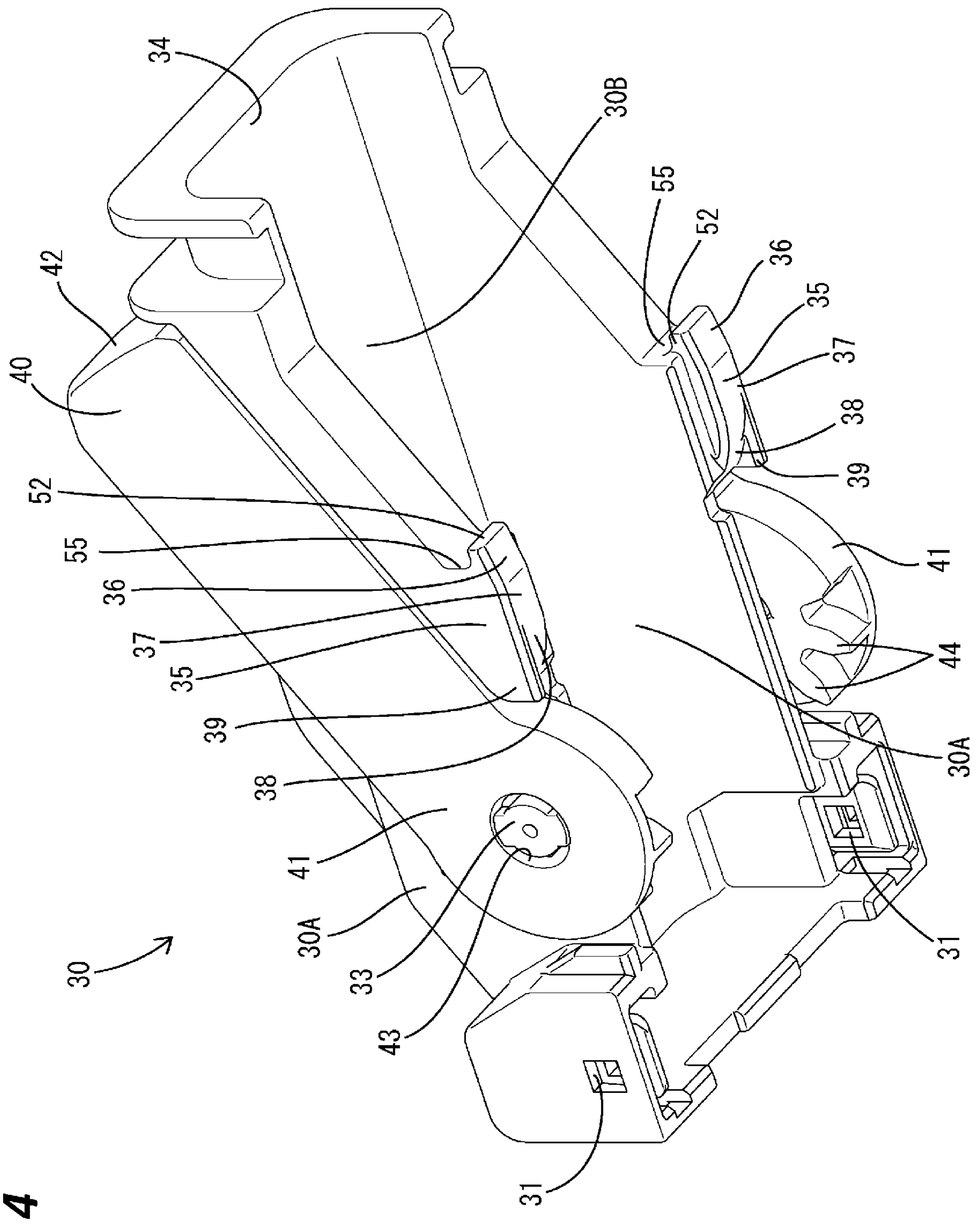
FIG. 4 is a perspective view of a wire cover.

The wire cover 30 is made of synthetic resin. As shown in FIG. 1, the wire cover 30 is attached to the housing 10 and covers the wire draw-out surface 12 of the housing 10. As shown in FIG. 4, the wire cover 30 has a pair of left and right side face portions 30A and an upper face portion 30B that connects upper ends of the pair of side face portions 30A. The upper face portion 30B faces the wire draw-out surface 12 when the wire cover 30 is in a state of being attached to the housing 10. The lower face of each side face portion 30A is parallel to the wire draw-out surface 12 of the housing 10 and close to the wire draw-out surface 12 when the wire cover 30 is in a state of being attached to the housing 10. Shafts 33 for attaching the lever 40 are provided to the left and right side face portions 30A. The lower face and the back face of the wire cover 30 are open. The wires W are bent backward by the wire cover 30. A back end portion of the wire cover 30 is a wire guide opening 34 for guiding the wires W backward.

The wire cover 30 has the lock receiving portions 31 to which the lock portions 13 are fitted. The lock receiving portions 31 are provided on both the left and right sides of the wire cover 30. The lock receiving portions 31 are holes running through walls of the wire cover 30 in the left-right direction.

As shown in FIG. 4, the wire cover 30 has the support portions 35. The support portions 35 are fitted to the support receiving portions 16 of the housing 10. Two support portions 35 are provided, one on the left side and the other on the right side of the wire cover 30. The support portions 35 are provided at rear end portions of the lower faces of the side face portions 30A of the wire cover 30. The support portions 35 are located in a center area in the front-back direction between the front end of the wire cover 30 and the wire guide opening 34. The size of each support portion 35 in the left-right direction is smaller than the size of each side face portion 30A in the left-right direction.

As shown in FIG. 6, the lower face of each support portion 35 includes an inclined face 36, a horizontal face 37, and a curved face 38. The inclined face 36 is provided at a rear end portion of each support portion 35. The inclined face 36 is inclined upward toward the rear when the wire cover 30 is in a state of being attached to the housing 10. The inclined face 36 constitutes the lower face of a later-described fitting portion 52. The horizontal face 37 is provided in a center area of each support portion 35 in the front-back direction. The horizontal face 37 is in surface contact with the bottom face 16A of the corresponding support receiving portion 16 when the wire cover 30 is in a state of being attached to the housing 10. The curved face 38 is provided at a front end portion of the support portion 35. The curved face 38 is curved upward toward the front when the wire cover 30 is in a state of being attached to the housing 10. Each support portion 35 has an outer wall portion 39 that is arranged on the outer side of the curved face 38 (on the right side in the right support portion 35, and on the left side in the left support portion 35). The outer wall portion 39 extends along the side face 16B of the corresponding support receiving portion 16. Each support portion 35 has fitting portions 52. The fitting portions 52 will be described later in detail.

As shown in FIG. 4, the lever 40 has a pair of left and right side plates 41 and a connecting portion 42 that connects ends of the side plates 41 to each other. The pair of left and right side plates 41 have attachment holes 43 to which the respective shafts 33 are fitted. The lever 40 is rotatably attached to the wire cover 30 by fitting the shafts 33 to the attachment holes 43.

The lever 40 is rotatable between a lever initial position, at which the lever 40 is held when fitting to the counterpart connector is initiated, and a lever fitting completion position, at which the lever 40 is held when the fitting to the counterpart connector is complete. FIG. 4 shows the lever 40 arranged at the lever initial position. The lever fitting completion position is a position rotated counterclockwise from the lever fitting completion position in FIG. 4. A gear 44 that meshes with the rack teeth 22 is provided on the outer face of each side plate 41 of the lever 40. The lever 40 moves the sliders 20 through the meshing between the gears 44 and the rack teeth 22.

The fulcrum portions 50 rotatably support the wire cover 30. The fulcrum portions 50 are provided on both the left and right sides of the housing 10. The fulcrum portions 50 are provided at rear end portions of the housing 10. Each fulcrum portions 50 has a protruding portion 51 and a rotation axis portion 53. The protruding portions 51 protrude upward (in a direction intersecting the first direction) from the housing 10.

The protruding portions 51 are provided in the respective support receiving portions 16 of the housing 10, as shown in FIGS. 5 and 6. The protruding portions 51 are walls that are provided at the rear ends of the support receiving portions 16. The protruding portions 51 protrude upward along the rear face of the housing 10 from the bottom faces 16A of the respective support receiving portions 16.

The rotation axis portions 53 are provided at upper end portions of the protruding portions 51. The rotation axis portions 53 serve as the rotation center of the wire cover 30. The rotation axis portions 53 protrude forward from the upper ends of the protruding portions 51.

Corner portions of the surfaces of the rotation axis portions 53 that come into contact with the wire cover 30 have curved faces 56, as shown in FIGS. 5 and 6. The curved faces 56 are provided at the upper and lower side of the front end of each rotation axis portion 53.

As shown in FIGS. 5 and 6, first fitting recessed portions 54 to which the respective fitting portions 52 are fitted are provided below the rotation axis portions 53. The first fitting recessed portions 54 are open on their front side. The depth (size in the front-back direction) of each first fitting recessed portion 54 is larger than the protruding length (size in the front-back direction) of each fitting portion 52. As a result, the rear end of each fitting portion 52 and the rear end of the corresponding first fitting recessed portion 54 are held away from each other in the front-back direction when the first fitting recessed portion 54 is in a state of being fitted to the fitting portion 52. In other words, a gap is formed between the rear end of each fitting portion 52 and the rear end of the corresponding first fitting recessed portion 54.

As shown in FIGS. 5 and 6, the fitting portions 52 are provided in the support portions 35 of the wire cover 30. Each fitting portion 52 is provided at the rear lower end of the corresponding support portion 35. The fitting portions 52 protrude backward along the lower faces of the support portions 35. The fitting portions 52 are fitted to the respective protruding portions 51 from the front (from a direction parallel to the first direction). The fitting portions 52 are fitted to the first fitting recessed portions 54.

As shown in FIGS. 5 and 6, second fitting recessed portions 55, to which the rotation axis portions 53 are fitted, are provided above the fitting portions 52. The second fitting recessed portions 55 are open on their rear side. The upper faces of the second fitting recessed portions 55 extend obliquely upward toward the rear, as shown in FIG. 6. The upper faces of the second fitting recessed portions 55 extend to the vicinity of the wire guide opening 34 of the wire cover 30.

As shown in FIGS. 5 and 6, the positioning portions 60 are provided in the support receiving portions 16. Each positioning portion 60 is provided at a position so that the corresponding fitting portion 52 is located between the positioning portion 60 and the corresponding protruding portion 51. Each positioning portion 60 has a gap S (see FIG. 6) that allows fine adjustment of the position of the wire cover 30 in the front-back direction so that the rack teeth 22 mesh with the gears 44, thus allowing the wire cover 30 to be positioned.

As shown in FIG. 3, each positioning portion 60 is provided in a center area of the corresponding support receiving portions 16 in the left-right direction. The positioning portions 60 protrude upward from the bottom faces 16A of the support receiving portions 16.

As shown in FIGS. 5 and 6, each positioning portion 60 has a positioning face 60A that is curved in the rotational direction of the wire cover 30. The positioning face 60A is curved so as to be located further upward as it extends forward away from the corresponding rotation axis portion 53. The positioning faces 60A are parallel to the curved faces 38 of the support portions 35 when the wire cover 30 is in a state of being attached to the housing 10. The vertical position of the upper end of each positioning face 60A is substantially is the same as the vertical position of the corresponding rotation axis portion 53.

Next, an example of an operation of assembling the lever-type connector C will be described.

First, terminal fittings are put into the housing 10. Specifically, the terminal fittings fastened to terminal portions of the wires W are inserted into the terminal accommodating holes 11 from the wire draw-out surface 12 side of the housing 10. After the terminal fittings have been put into the terminal accommodating holes 11, the wires W are in a state of being pulled out from the wire draw-out surface 12.

Next, the wire cover 30 is attached to the housing 10 (see FIGS. 5 and 6). At this time, the lever 40 is held at the lever initial position relative to the wire cover 30. Each slider 20 is held at the slider initial position relative to the housing 10 in advance. Then, the wire cover 30 is inclined relative to the housing 10 as shown in FIG. 5. The support portions 35 of the wire cover 30 are inserted into the support receiving portions 16 of the housing 10 from obliquely front and above. The fitting portions 52 of the wire cover 30 are shallowly fitted to the first fitting recessed portions 54 of the housing 10 from the front. The fitting portions 52 have a tapered shape due to the inclined faces 36, and are therefore easily fitted to the first fitting recessed portions 54. Meanwhile, the rotation axis portions 53 of the housing 10 are shallowly fitted to the second fitting recessed portions 55. This makes the wire cover 30 to be supported by the housing 10 so as to be rotatable about the rotation axis portions 53. The lower faces of the support portions 35 are separate from and located above the bottom faces 16A of the support receiving portions 16.

Next, the wire cover 30 is rotated forward. The wire cover 30 rotates about the rotation axis portions 53. The position of the wire cover 30 in the front-back direction is finely adjusted while rotating the wire cover 30. The support portions 35 of the wire cover 30 are displaced along the positioning faces 60A of the housing 10. The positions of the support portions 35 of the wire cover 30 in the front-back direction are finely adjusted within the area of the gap S between the support portions 35 and the positioning faces 60A.

The fitting portions 52 are displaced backward along the curved faces 56 of the rotation axis portions 53 and deeply fitted to the first fitting recessed portions 54, as shown in FIG. 6. The upper faces of the fitting portions 52 come into surface contact with the lower faces of the respective rotation axis portions 53. The horizontal faces 37 of the support portions 35 come into surface contact with the bottom faces 16A of the respective support receiving portions 16. The curved faces 38 of the support portions 35 are then arranged above the positioning faces 60A of the respective support receiving portions 16. The support portions 35 coming into contact with the positioning faces 60A cause the gears 44 of the wire cover 30 to be arranged at the position at which they mesh with the rack teeth 22. Accordingly, the gears 44 mesh with the rack teeth 22 without pressing the sliders 20 as a result of coming into contact with the rack teeth 22. After the wire cover 30 has thus reached the normal attachment position, the lock portions 13 of the housing 10 are fitted to the respective lock receiving portions 31 of the wire cover 30. The operation of assembling the lever-type connector C is completed by the above procedure. Note that the inclined faces 36 of the support portions 35 are separate from the bottom faces 16A of the support receiving portions 16 both in the middle of attaching the wire cover 30 and when the attachment is complete.

Next, the operation and effects of the lever-type connector C having the above configuration will be described.

The lever-type connector C has a housing 10, sliders 20, a wire cover 30, a lever 40, fulcrum portions 50, and positioning portions 60. The sliders 20 are movable in the front-back direction (first direction) relative to the housing 10. Each slider 20 has a plurality of rack teeth 22 that are arranged in the front-back direction. The wire cover 30 is installed on the housing 10 and covers the wire draw-out surface 12 of the housing 10. The lever 40 is rotatably installed on the wire cover 30. The lever 40 has gears 44 that mesh with the rack teeth 22 and moves the sliders 20. The fulcrum portions 50 are provided in the housing 10. The fulcrum portions 50 rotatably support the wire cover 30. The positioning portions 60 are provided in the housing 10. The positioning portions 60 come into contact with the wire cover 30 and cause the gears 44 to be located at the positions at which the gears 44 can mesh with the rack teeth 22.

This configuration enables the wire cover 30 to be positioned so that the gears 44 mesh with the rack teeth 22 when the wire cover 30 is rotated while being supported by the fulcrum portions 50. Accordingly, the gears 44 of the wire cover 30 can be prevented from coming into contact with the rack teeth 22 of the sliders 20 and shifting the positions of the sliders 20 when the wire cover 30 is attached to the housing 10.

Each fulcrum portion 50 has a protruding portion 51 that protrudes upward from the housing 10. The wire cover 30 has fitting portions 52 that are fitted to the protruding portions 51 from the rear. The positioning portions 60 are provided at the opposite positions to the protruding portions 51 with the fitting portions 52 therebetween. Each positioning portion 60 has a positioning face 60A that is curved in the rotational direction of the wire cover 30. This configuration enables the wire cover 30 to be easily positioned.

Gear arrangement portions 15, in which the gears 44 are arranged when the wire cover 30 is in a state of being attached to the housing 10, are arranged in a center area of the housing 10 in the front-back direction. Both the protruding portions 51 and the positioning portions 60 are arranged behind the gear arrangement portions 15 in the front-back direction. This configuration enables the housing 10 to be made more compactly than in the case where the protruding portions and the positioning portions are provided on the front and rear sides of the housing 10 in the front-back direction.

Each fulcrum portion 50 has a rotation axis portion 53 serving as a rotation center of the wire cover 30. Corner portions of the surface of each rotation axis portion 53 that come into contact with the wire cover 30 have curved faces 56. This configuration enables the wire cover 30 to be smoothly rotated compared to the case where the corner portions of the surface of each rotation axis portion that come into contact with the wire cover are right-angled.

Other Embodiments of Present Disclosure

The embodiment disclosed herein is in all respects illustrative and should not be considered restrictive.

(1) In the above embodiment, the fulcrum portions 50 are provided on both the left and right sides, whereas only one fulcrum portion 50 may alternatively be provided in another embodiment. In this case, the fulcrum portion may be provided in a center area of the lever-type connector in the left-right direction.

(2) In the above embodiment, the rotation axis portions 53 protrude forward from the protruding portions 51, whereas the rotation axis portions may alternatively protrude backward from the protruding portions in another embodiment. In this case, the fitting portions of the wire cover may be fitted to the protruding portions from the rear.

(3) In the above embodiment, the fulcrum portions 50 and the positioning portions 60 are provided on one end side (rear end side) of the housing 10. However, in another embodiment, the fulcrum portions may alternatively be provided on one end side of the housing in the front-back direction, and the positioning portions may alternatively be provided on the other end side of the housing 10 in the front-back direction.

(4) In the above embodiment, the fulcrum portions 50 and the positioning portions 60 are provided in the support receiving portions 16 that are recessed portions of the housing 10. However, in another embodiment, the fulcrum portions and the positioning portions need not be provided in such recessed portions.

LIST OF REFERENCE NUMERALS

C Lever-type connector
S Gap
W Wire
10 Housing
11 Terminal accommodating hole
12 Wire draw-out surface
13 Lock portion
14 Lock wall
15 Gear arrangement portion
16 Support receiving portion
16A Bottom face
16B Side face
20 Slider
21 Cam groove
22 Rack tooth
30 Wire cover
30A Side face portion
30B Upper face portion
31 Lock receiving portion
33 Shaft
34 Wire guide opening
35 Support portion
36 Inclined face
37 Horizontal face
38 Curved face
39 Outer wall portion
40 Lever
41 Side plate
42 Connecting portion
43 Attachment hole
44 Gear
50 Fulcrum portion
51 Protruding portion
52 Fitting portion
53 Rotation axis portion
54 First fitting recessed portion
55 Second fitting recessed portion
56 Curved face
60 Positioning portion
60A Positioning face (a face that is curved in the rotational direction of the wire cover)

What is claimed is:

1. A lever-type connector comprising:
a housing;
a slider having a plurality of rack teeth arranged in a first direction, the slider being movable in the first direction relative to the housing;
a wire cover installed on the housing and covering a wire draw-out surface of the housing; and
a lever configured to move the slider, the lever being rotatably installed on the wire cover and having a gear meshing with the rack teeth,
wherein the housing has
a fulcrum portion rotatably supporting the wire cover and including a protruding portion protruding from the housing in a direction intersecting the first direction, a rotation axis portion at an upper end of the protruding portion, and a first fitting recessed portion below the rotation axis portion;
a positioning portion opposing the protruding portion in the first direction and coming into contact with the wire cover when the wire cover is attached to the housing; and
a support receiving portion between the fulcrum portion and the positioning portion and coming into contact with the wire cover when the wire cover is in a state of being attached to the housing,
the wire cover includes a fitting portion protruding from the wire cover in the first direction and rotatable about the rotation axis portion to be fitted in the first direction to the protruding portion in the first fitting recessed portion, and
the positioning portion and the support receiving portion cause the gear to be located at a position at which the gear meshes with the rack teeth when the wire cover is in the state of being attached to the housing such that the gear is suppressed from contacting the rack teeth and shifting a position of the slider when the wire cover is attached to the housing.

2. The lever-type connector according to claim 1,
wherein the positioning portion is located at an opposite position to the protruding portion relative to the fitting portion and has a face curved in a direction in which the wire cover rotates.

3. The lever-type connector according to claim 1,
wherein the housing has a gear arrangement portion in its center area in the first direction, the gear being arranged in the gear arrangement portion when the wire cover is in the state of being attached to the housing, and both the protruding portion and the positioning portion are located on one side in the first direction relative to the gear arrangement portion.

4. The lever-type connector according to claim 1,
wherein a corner portion of a surface of the rotation axis portion that comes into contact with the wire cover has a curved face.

5. The lever-type connector according to claim 1, wherein the positioning portion has a position surface curved so as to be located further upward as it extends away from the rotation axis portion.

6. The lever-type connector according to claim 1, wherein the support receiving portion is located upwardly of the rack teeth.

7. The lever-type connector according to claim 1, wherein the support receiving portion connects the fulcrum portion and the positioning portion, the wire cover further includes a support portion from which the fitting portion protrudes in the first direction along a lower face of the support portion, and the support portion is between the lever and the housing and in contact with the support receiving portion below the support portion when the wire cover is in the state of being attached to the housing.

* * * * *